Feb. 4, 1936.　　　J. R. SUTILEF　　　2,029,953
WIRE REEL
Filed Dec. 3, 1934　　　2 Sheets-Sheet 1

John R. Sutilef
INVENTOR
BY Victor J. Evans & Co.
ATTORNEY

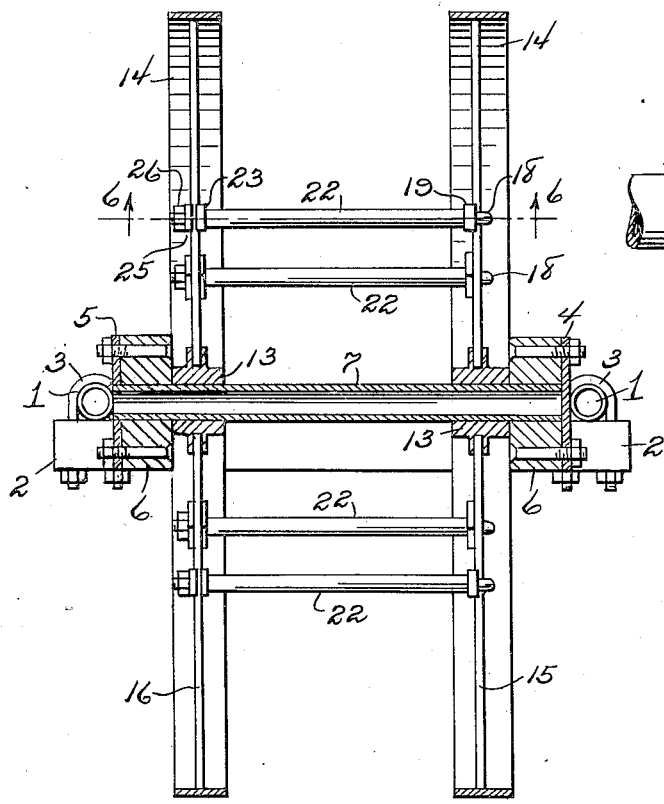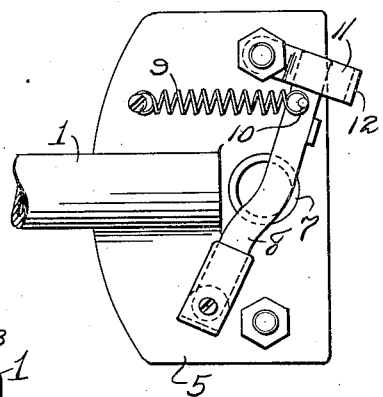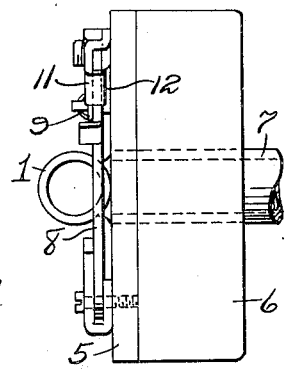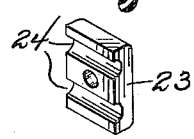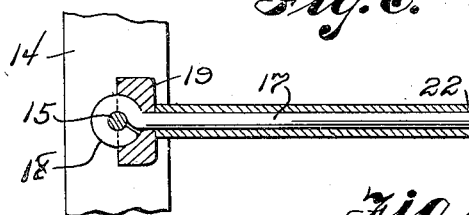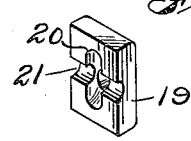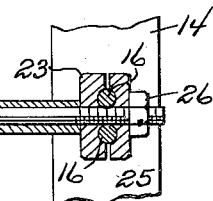

Patented Feb. 4, 1936

2,029,953

UNITED STATES PATENT OFFICE 2,029,953

WIRE REEL

John R. Sutilef, Lapine, Oreg.

Application December 3, 1934, Serial No. 755,824

2 Claims. (Cl. 242—90)

This invention has for its object the provision of a strong and simple implement for carrying fence wire on the original spool or taking up wire from an old fence which may be handled by one man and may be readily set for a coil of any diameter. A reel embodying the invention is illustrated in the accompanying drawings and will be hereinafter fully described, the novel features being more particularly defined in the appended claims.

In the drawings:

Figure 3 is a section on the line 3—3 of Figure 1, on a larger scale.

Figure 4 is a detail elevation of an axle locking device.

Figure 5 is a front elevation of the structure shown in Figure 4.

Figure 6 is an enlarged detail section on the line 6—6 of Figure 3.

Figures 7 and 8 are detail perspective views of clamps employed in connecting cross bars and spokes in the wheels shown in Figure 3.

Figure 2:
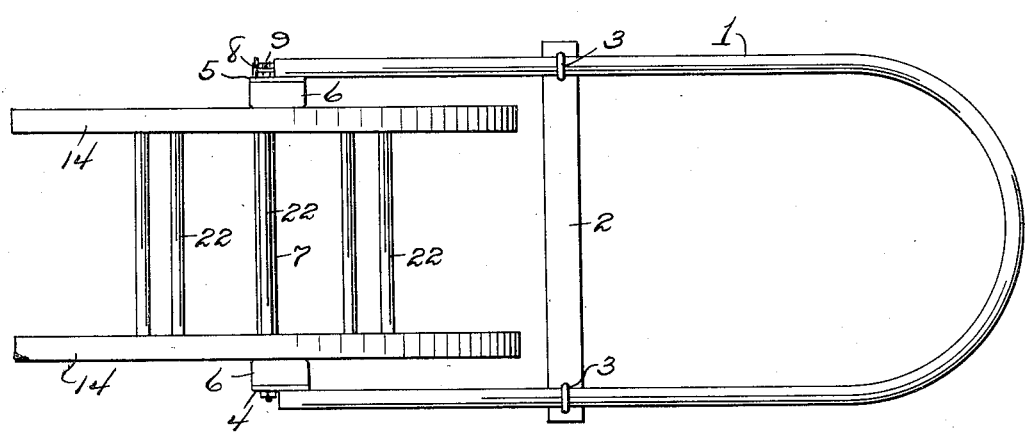
Figure 2 is a plan view.

In carrying out the present invention, there is provided a frame comprising a rod or tube 1 which is bent into U-shape, as shown in Figure 2, producing a pair of shafts for pulling or pushing the implement. A cross bar 2 is adjustably mounted on the shafts by clips 3 to resist spreading of the shafts, thereby aiding in holding them in proper relation to the axle, and also to serve as a leverage for canting a wire reel as will presently more fully appear. Plates 4 and 5 are welded to the rear ends of the shafts and wooden blocks 6 are bolted to the inner sides of the plates, the plate 4 being imperforate and both blocks and the plate 5 having central openings to receive the axle. The axle 7 is a tube or a rod of circular cross section which is inserted through the openings in the blocks and the plate 5 with one end abutting the plate 4, as shown in Figure 3.

Pivoted upon the plate 5 below the axle and the end of the frame is a latch or lever 8 which is yieldably held across the end of the axle, as shown in Figure 4, by a retractile spring 9 which has its front end anchored upon the plate 5 and its rear end engaged over a stud 10 on the lever at or near its upper end. A guard 11 is secured upon the plate 5 and extends over the lever, as shown in Figure 4, to hold the latter in operative position, and has a lip 12 at its front free end against which the lever may rest when it is rocked forward to uncover the end of the axle, with the spring removed from the stud thus leaving both hands of the operator free to remove the axle.

Hubs 13 rotatably fit upon the axle at the inner sides of the blocks 6 and spokes are cast in and radiate from the hubs, tires or treads 14 being secured upon and carried by the outer ends of the spokes. The spokes in one wheel are single rods 15 but the spokes in the other wheel are two parallel rods 16, or a bar formed with a longitudinal slot. Cross rods 17 extend between corresponding spokes of the wheels, and in assembling the parts one end of each rod is bent around a spoke 15 to form an eye 18 slidable along the spoke. The opposite end of the cross rod is threaded, as shown in Figure 6, and passes through the space between spoke rods 16. A washer or clamping block 19 is fitted upon the cross rod 17 and is formed in its outer face with a socket 20 to seat the eye 18 and with an open-ended groove 21 to engage around the spoke 15. A spacer sleeve 22 encircles the rod 17 and abuts the block 19 at one end while its opposite end abuts a clamping block 23 which is mounted upon the rod 17 and has grooves 24 in its outer face to fit against the inner sides of the spoke rods 16. A mating clamping block 25 is fitted on the end of the rod against the outer sides of the spokes and a nut 26, turned home against the block 25, secures all the parts firmly together.

Figure 1:
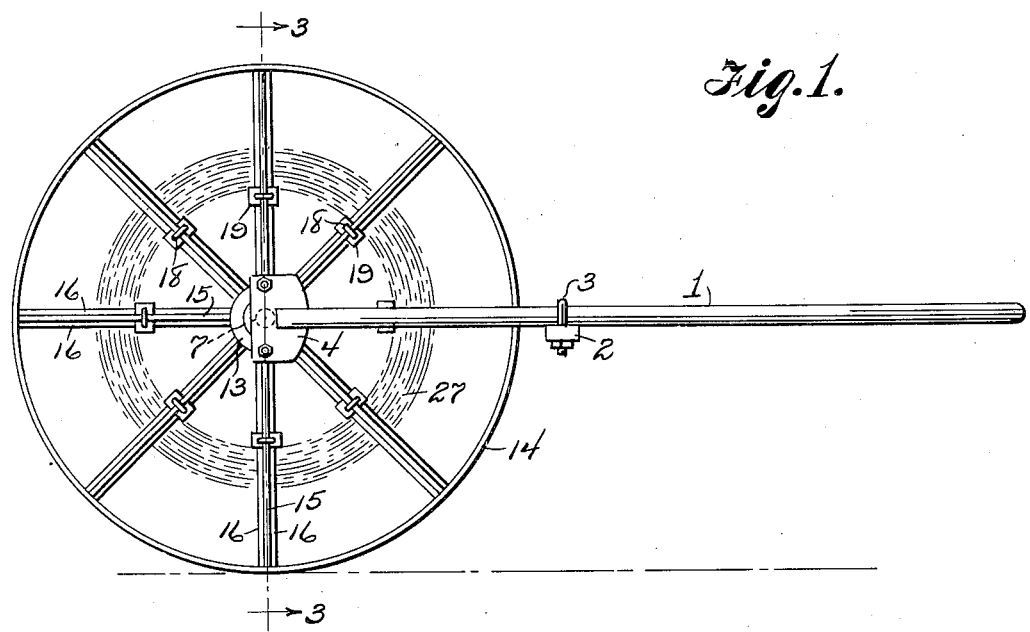
Figure 1 is a side elevation of the implement.

The axle 7 is easily removable from the hubs 13, as will be understood from what has been said. When barbed wire is to be strung, the U-shaped frame is brought into position astride of the original reel or spool on which the wire is coiled, and the axle 7 is then inserted through the plate 5, block 6 and core of the reel and locked by the latch lever 8, the end disks of the reel serving as wheels or rollers. The wire is secured at one end to a fence post and the frame is then pulled along the line of the fence, the wire unwinding from the bottom of the reel. Should stumps or other obstructions be encountered, the cross bar or brace 2 serves as an additional handle or lever for lifting the reel over the obstruction. Should it be found necessary to carry the wire between two trees or other objects which are so close that the reel cannot roll between them, the cross bar may be utilized as a lever for canting the reel so that it may pass endwise. When all the wire has been unwound, the reel may be released by withdrawing the axle and then merely lifting the frame from the reel. If unneeded wire is to be picked up from a fence, the U-shaped frame is brought into position about the wheels shown and described and locked thereto by inserting the axle. The wire is pulled tight by hand and one end is fastened to one of the cross bars 22. The wheels are then pushed over the line of wire which will wind thereon from the bottom, and form a coil, as indicated at 27 in Figure 1. If the wire gets slack, it may be tightened by dragging the wheels backward while holding them against rotation. The wire will be wound in a neat coil and may be dispensed from the coil by pulling the wheels over the line where the wire is to be strung, the handles or frame constituting a convenient means for keeping the implement in the prescribed path.

Having described my invention, what I claim is:

1. A reel comprising side bars, plates secured to the rear ends of the bars, one of said plates being imperforate and the other plate having an opening therethrough, blocks secured to the inner sides of the plates and having central openings, an axle inserted through the openings with one end abutting the imperforate plate, a lever pivoted on said plate below the opening therein, yieldable means normally holding the lever across the opening, a guard extending over the lever and against which the lever may abut to be held at one side of the opening, and a carrier rotatably mounted on the axle.

2. A wire-carrying reel comprising a hauling frame, wheels mounted in the rear end of the frame, the spokes in one wheel having longitudinal openings, cross rods having threaded ends passing through said openings and having their opposite ends formed into eyes slidably encircling the spokes of the other wheels, spacers encircling the rods between the wheels, clamping blocks on the rods at the ends of the spacers and fitted to the spokes, and nuts on the ends of the rods bearing against the outer clamping blocks.

JOHN R. SUTILEF.